(12) United States Patent
Friesel et al.

(10) Patent No.: US 8,149,161 B1
(45) Date of Patent: Apr. 3, 2012

(54) METHOD AND SYSTEM FOR AZIMUTHAL CONTAINMENT USING LARGEST GAP METHOD

(75) Inventors: Mark A. Friesel, Ewing, NJ (US); Thomas R. Gillespie, Cinnaminson, NJ (US)

(73) Assignee: Lockheed Martin Coporation, Bethesda, MD (US)

( * ) Notice: Subject to any disclaimer, the term of this patent is extended or adjusted under 35 U.S.C. 154(b) by 0 days.

(21) Appl. No.: 12/906,566

(22) Filed: Oct. 18, 2010

(51) Int. Cl.
*G01S 13/08* (2006.01)
(52) U.S. Cl. ......... 342/133; 342/118; 342/147; 342/165
(58) Field of Classification Search .................. 342/133, 342/118, 147, 165
See application file for complete search history.

(56) References Cited

U.S. PATENT DOCUMENTS

| | | | |
|---|---|---|---|
| 4,467,447 A | 8/1984 | Takahashi et al. | |
| 5,890,012 A | 3/1999 | Poisner | |
| 7,184,036 B2 | 2/2007 | Dimsdale et al. | |
| 7,221,307 B1 | 5/2007 | Friesel | |
| 2006/0202886 A1 | 9/2006 | Mahapatra et al. | |
| 2007/0018882 A1 | 1/2007 | Manoogian et al. | |
| 2007/0194983 A1* | 8/2007 | Stove | 342/185 |
| 2008/0153414 A1 | 6/2008 | Ho et al. | |
| 2008/0210016 A1 | 9/2008 | Zwim et al. | |

* cited by examiner

*Primary Examiner* — Timothy A Brainard
(74) *Attorney, Agent, or Firm* — Howard IP Law Group (57) ABSTRACT

A maximum gap method and system provide for identifying a space sector within which a system capable of engaging an object, should search for the object. A detector system that may be a radar or other active range determination system tracks position of the moving object and based on position estimates and the uncertainties associated with the position estimates, generates a range of possible positions for each estimate then determines gaps between the uncertainties and derives the search sector based on the maximum gap.

23 Claims, 4 Drawing Sheets

METHOD AND SYSTEM FOR AZIMUTHAL CONTAINMENT USING LARGEST GAP METHOD

TECHNICAL FIELD

The present disclosure relates, most generally, to radar and other active range determination systems and methods, and more particularly to a system and method for locating a moving object and identifying a space sector within which a system with engagement or defense capabilities should search for the object.

BACKGROUND

In many defense and other applications, a first detector system observes movement of an object and, based upon this movement, provides information to a second system that has defensive capabilities or which can otherwise engage the object. The first detector system may be a radar or other active range determination system and may be a central detector system or other remote sensor that observes the movement of the object and provides information to the second system. It is of paramount importance for the first system to identify a sector within which the second system should search for the object because it is critical for the second system to locate the object as quickly as possible, especially in the military arena when defensive tactics may be exigently required. This is true for various applications regardless of the action desired to be taken by the second system with defensive or active engagement capabilities and also applies to any of various first detector systems that track positions of objects in space, estimate the positions of the object and assign a degree of uncertainty to the position estimates.

The second system with defensive or active engagement capabilities that uses the information provided by the first system to determine where to search for the object, typically includes an active range determination system itself such as a radar, but requires location information from the first system in order to know where to search for the moving object, especially in exigent circumstances, so that it may respond efficiently and quickly. It would therefore be desirable for the first system to accurately identify a limited space sector within which the second system should search for the object.

The tracking and monitoring of such moving objects is advantageously and conventionally done using the azimuthal angle of the object's overhead position detected or estimated by the first system with respect to an origin O, with the azimuth being the angle between a reference radius N and a vector representing the perpendicular projection of the object's position on the horizon. It is desirable for the first central tracking system or remote sensor to provide information to the second system that identifies which space sector to search, the space sector advantageously identified as an arc of a circle centered on origin O, according to common convention.

Conventional methods consider only the progression of estimates or measurements and assume that any intermediate measurement must lie between the extrema. Consequently, when evaluating whether an angular interval, i.e., an arc of a circle centered at origin O, contains a reference angle, the occurrence of an intermediate measurement indicating the incorrect arc will result in an incorrect conclusion.

One conventional method for estimating the current position of a moving object with respect to a central origin, is a method that relies on progression of measured or estimated locations to predict the current position. This method utilizes average values in sequential measurements but includes limitations, however. For example, the "average" values in sequential measurements of a progressive function (f(t) monotonic) with superimposed random noise, where average values lie between extrema defining an arc of a circle, may occur out of sequence due to uncertainties. Measurements of angular displacement of a trajectory of a moving object over a time interval result in a series of sequential position estimates between extrema, e.g. the angles corresponding to the position estimates at the earliest and latest observation times, which define the end points of an arc enclosing intermediate angle measurements. When these estimates contain noise, such measurements may produce an incorrect sequence of angles of measurement. Particularly for noisy radial estimates, intermediate angles of measurement may appear outside the extrema. Logically, limits that define an arc of a circle divide space into two regions: a clockwise arc between the extrema and a counterclockwise arc between the extrema. Due to the limitations in relying solely on the progression of the "average" values, an error may result in the determination of which of the two possible arcs defined by the extrema, contain intermediate unmeasured values of the function, and possibly the moving object.

When moving objects are tracked by a central observer, it is also desirable to determine if a reference angle, i.e., an azimuth or elevation such as due North, has been crossed or whether a radial vector is included by a range of solid angle measurements, i.e. whether the bounds of the identified search sectors contain North or another radial vector.

The present disclosure addresses the above-identified shortcomings and needs.

SUMMARY

To address these and other needs, and in view of its purposes, the disclosure provides and utilizes a maximum gap method for estimating a contemporary position of a moving object and an associated system for doing so.

One aspect of the disclosure provides a method for identifying a space sector within which to search for an object. The maximum gap method comprises estimating three chronologically sequential locations of a moving object by a central detector thereby obtaining three estimated sequential locations. The method further provides for assigning a degree of uncertainty to each of the three estimated sequential locations, each degree of uncertainty characterized by a minimum location and a maximum location. The method further provides for calculating gaps between minimum and maximum locations of adjacent ones of the estimated sequential locations, determining a maximum gap of the calculated gaps and identifying a space sector within which to search for the moving object based on the maximum gap.

Also provided is a system for identifying a space sector within which to search for an object. The system includes a central detector for estimating at least three chronologically sequential locations of a moving object. The system assigns a degree of uncertainty to each of the estimated locations thereby obtaining three estimated sequential locations. Each degree of uncertainty is characterized by a minimum location and a maximum location. The system further includes a processor for calculating gaps between minimum and maximum locations of spatially adjacent ones of the estimated sequential locations and also for determining a maximum gap of the calculated gaps. The system further comprises means for identifying a space sector within which to search for the moving object, based on the maximum gap.

BRIEF DESCRIPTION OF THE DRAWING

The present disclosure is best understood from the following detailed description when read in conjunction with the accompanying drawing. It is emphasized that, according to common practice, the various features of the drawing are not necessarily to scale. On the contrary, the dimensions of the various features may be arbitrarily expanded or reduced for clarity. Like numerals denote like features throughout the specification and drawing.

FIG. 1 shows three sequential data points plotted to show the estimates of their positions and the uncertainty in the measurements;

FIG. 2 shows the data points of FIG. 1 transformed and relabeled according to one exemplary embodiment of the disclosure in order to determine a maximum gap;

FIG. 3 is a graphical representation showing the identification of the correct sector to search for the object based on the disclosure and with respect to the position estimates and uncertainties provided in FIGS. 1 and 2.

DETAILED DESCRIPTION

The disclosure finds application in any of various systems that track position of a moving object and provide estimates of the position of the moving object and uncertainties associated with each estimate. Such detection systems include but are not limited to radar systems, laser ranging systems, other active range determination systems and any electronic monitoring system that measures the two or three-dimensional position of an object and provides an estimate of the uncertainty of each of the measurements.

In many applications, such detection systems are useful for locating objects but do not include the capability to engage the object with offensive or defensive tactics. Such detection systems may be considered to be remote sensors or central observers that search space for objects. Such detection systems advantageously obtain positional information on an object by various modes of detection and/or estimation and transmit or otherwise provide this information to a further system that has the capability to both search for the object and engage the object. The transmitted or otherwise conveyed information includes information on the estimated positions of an object, the corresponding estimates of the uncertainty of the measurements used to detect the estimated positions, and may include a prediction on the current position of the object. In particular, the information may identify a space sector within which to search for the object. In another exemplary embodiment, the prediction on the current position of the object and the space sector in which to search, may be provided by a further processing system, and not the detection system itself. The further system capable of engaging the object utilizes this information provided by the detection or processing system in searching for and locating the object so that the further system can fire at the object, communicate with the object or otherwise engage the object with various offensive or defensive actions.

A maximum gap method is provided and utilized to determine which space sector a system with engagement capabilities should search, or evaluate, when searching for an object. For an object moving through space through a sequence of positions, the positions are monitored by the detection system, i.e., a central observer/remote sensor by detection and/or estimation, and may be identified as azimuths with respect to a circle centered at a central location, as according to common convention. More particularly, based on the position measurements/estimates and the uncertainties in the measurements provided by the detection system, in one embodiment, the maximum gap method identifies which of the two arcs of a circle defined by the extrema positions, should be searched by the further system with engagement capabilities.

When successive positions are tracked or estimated relative to a central location and azimuthally defined with respect to radial locations about a circle centered about the central location for example, the first and last tracked positions define an arc of the circle and therefore divide the circle into two sectors, the arc defined by the clockwise direction between the first and last points and the arc defined by the counter-clockwise direction between the first and last points. Unlike previous, conventional methods which use the azimuth of an intermediate position estimate to determine which of the two sectors should be searched, the disclosed method utilizes the accuracy associated with the position estimates to identify the correct search sector.

According to one exemplary embodiment of the disclosure, a moving object is observed by a detector system which may be an active range determination system such as a radar or other active range determination system that provides estimates of the position of the object along with the associated uncertainties in the estimates. An engagement system such as one with engagement or defensive capabilities desires to locate the object based on information provided directly by the detector system or by a further processor system. The detector or further processor system may provide information through transmission or various other conventional means.

According to one embodiment, three position estimates are made, each with an associated uncertainty thus defining a range of possible locations for each position estimate. According to this exemplary embodiment, the detector system, e.g. central observer/remote sensor, provides three sequential data points, i.e. estimated object positions and associated times, based upon three separate chronologically sequential detections made by the detector system. According to another exemplary embodiment, the three sequential data points may be propagated from the time of the initial observation to two later times using an appropriate trajectory method. The associated uncertainties each define a range of possible locations of the positional estimate such that a sector extending from the nominal position minus the uncertainty, to the nominal position plus the uncertainty, carries with it a specific probability of containing the object, i.e. a 65% likelihood of containing the object, a 95% likelihood of containing the object, or various other likelihoods of containing the object. The associated uncertainties are characteristics of the detection system and are provided by the detection system. The three chronologically sequential data points are presented and considered with respect to spatial locations thus providing three positions, each characterized by a nominal position and minimum and maximum positions, thus providing three minimum data points and three maximum data points in the exemplary embodiment.

The method of the disclosure provides for identifying the two bounding extrema of the six minimum and maximum data points and identifying which arc of a circle bounded by the two bounding extrema points should be the search sector, i.e. whether the arc including North or the other, complementary arc, is the appropriate sector to be searched, i.e. the sector that most likely contains the object. The maximum gap method determines the size of all of the gaps, i.e. the sectors lying between and not within the uncertainties of the position data. Each position estimate with associated uncertainties identifies a range of possible locations and the gaps lie between the ranges of possible locations. The search sector is calculated from data points and extrema ordered as described, such that each gap represents the maximum bound associated with one data point subtracted from the minimum bound of the succeeding data point and the search sector size is determined by the largest of these gaps. In particular, the maximum sector excluded by the measurement uncertainties is found to be the least likely sector to contain the object, i.e. the method provides that the largest of these gaps is least likely to contain the object, hence the complementary sector is the most likely to contain the object and constitutes the search sector that should be searched by the system with engagement or defensive capabilities.

It should be pointed out that, although the exemplary embodiment described in further detail herein includes three position estimates, the present disclosure may alternatively utilize various numbers of position estimates.

Figure 1:
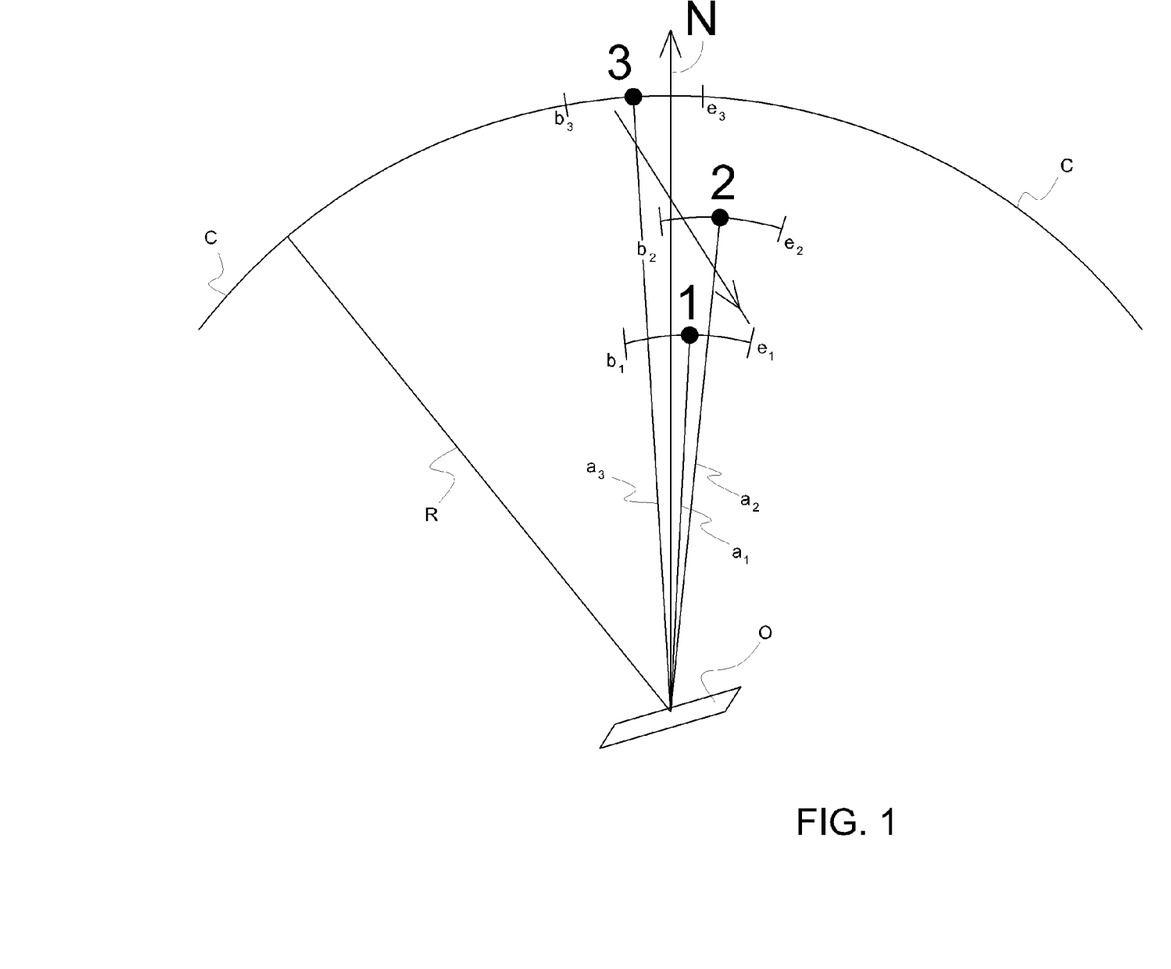
FIGS. 1-3 are graphical representations showing the tracking of an object.

One exemplary embodiment may be illustrated by considering circle C with radius R centered on an origin O as illustrated in FIG. 1. Origin O may represent the platform of the central detector. The three sequential, i.e. chronologically obtained, data points, i.e. object positions and associated uncertainties, are conventionally represented by azimuths with respect to origin O and may be displayed using various conventional means. Object positions 1, 2, 3 each represent the nominal sequential position of the moving object estimated or detected by the central detector. Each azimuth representing the position of the moving object may be expressed as the angle between a radius and an arbitrary reference radius N, north in the illustrated embodiment of FIG. 1. The three sequentially detected/estimated points 1, 2, 3 are located at corresponding azimuths $a_j$, as shown in FIG. 1, with respect to circle C centered about origin O, i.e. $m_j$, j=1, 2, 3 in which indices 1, 2 and 3 refer to the time sequence in which the detected/estimated position data was obtained. Each $m_j$ represents the center, in a general sense, of some distribution of azimuths lying between start $b_j$ and stop $e_j$ azimuths such that the single sector start-to-stop direction is clockwise. The points $b_j$ and $e_j$ may also be considered minimum and maximum, respectively, for each associated point $m_j$ in the clockwise direction. The range between $b_j$ and $e_j$ represents the range of possible locations of the position estimate based upon the measurement uncertainties, as discussed supra.

The movement of the object may be described by a continuous function f(t) of a monotonically increasing variable t and some random function n(t) such that azimuth a=f(t)+n(t), and such that $a_j$=f($t_j$)+n($t_j$) lies between $b_j$ and $e_j$ with some known probability, i.e. the trajectory of the object is continuous and can be represented by a function of time plus an uncertainty. The maximum gap method identifies a gap between the distribution of azimuths associated with each position estimate and then identifies the search sector. The maximum gap method is utilized to identify a search sector according to the following exemplary calculation and may utilize various mathematical assumptions to simplify the execution of the calculation. Other processing techniques may be used for the special case when search over all azimuths $e_j$ is required according to the embodiment in which $e_j$–$b_j$ equals or exceeds $2\pi$ and, thus, there is no gap.

FIG. 1 thus shows the three points, $m_j$, j=1, 2, 3 along with associated start $b_j$ and stop $e_j$ azimuths plotted relative to north radius N and origin O. FIG. 1 also shows nominal locations 1, 2, 3 of the position estimates located at corresponding azimuths $a_j$, j=1, 2, 3.

The disclosed method provides for identifying the pair of extrema that bound all of the above data. The method also determines which of the two arcs bounded by the extrema should be the search sector and thus whether the search sector contains the azimuth of North, though North may be replaced in various embodiments by any azimuth (or elevation) given an appropriately transformed coordinate system.

According to this exemplary embodiment, three position estimates provide three sets of data, each set comprised of a nominal position m, and a minimum (or start) b and maximum (or end) e. The nominal position of each data set will always lie between the minimum (start) and maximum (end) azimuth of that data set. The maximum gap method then provides for mathematically manipulating the data to a) find the largest azimuthal gap between data sets and determine the search sector most likely to currently contain the object, and b) determine whether North is within the corresponding search sector.

Figure 2:
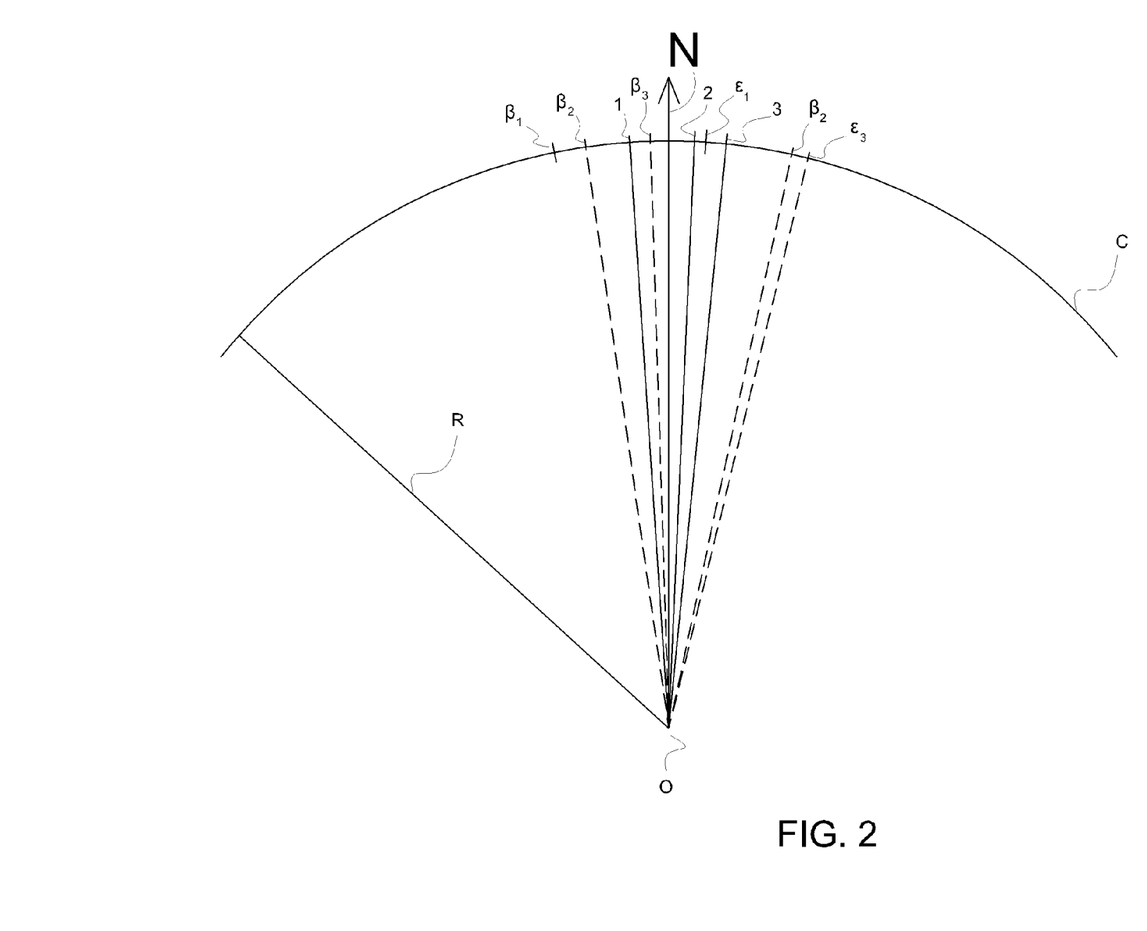

The three location estimates of the chronological position of the object, as described supra and identified and labeled according to the order in which they were received, are then advantageously replaced by an appropriately transformed data set in which the data points are considered and may be relabeled with respect to spatial position about circle C, as opposed to sequence, to mathematically determine the maximum gap and the search sector such as illustrated in FIG. 2. Each transformed position estimate includes associated minimum, nominal and maximum azimuths. Each position estimate thus includes an associated minimum azimuth and the smallest minimum azimuth along the clockwise direction of circle C, will be designated by index 1, the middle minimum azimuth will be designated by index 2 and the largest minimum azimuth will be identified with index 3. In other words, one of the minimum azimuths will be smaller than the others and will be labeled with index 1 regardless of how it was initially labeled, e.g. it may have been the second data point in time and initially designated by an index 2, according to the exemplary embodiment with three data points. The transformed data may then be mathematically manipulated as in the following examples.

According to one exemplary embodiment, the determination of the search sector is carried out according to the following approach which also identifies whether the search sector is the one that contains North crossing:
 a) if any $e_j$–$b_j \geq 2\pi$, for any point mj there is no gap, the search sector contains North and the search must be carried out over all azimuths.
 b) otherwise, proceed to determine the maximum gap and search sector according to the following data transformation: relabel each 4 (FIG. 1) as (FIG. 2), order clockwise from $\beta_1$=min($b_j$) to $\beta_3$=max($b_j$) and retain the mapping.
 c) define $\epsilon_k$ as the $\epsilon_j$ associated with $\beta_k$.
 d) for each $\beta_j$
  i. if the most proximate minimum or maximum ($\beta_k$ or $\epsilon_k$) in the counter-clockwise direction is $\epsilon_k$
  ii. and if the remaining $e_m$ lie between $\beta_m$ and $\epsilon_k$ clockwise from $\beta_m$,
  iii. then $\delta_j=\beta_j-\epsilon_k$ is a gap.
  iv. If j=1 and $\epsilon_k>\beta_1$ then $\delta_1=\delta_1+2\pi$
 e) Set $\delta_{max}$=max($\delta_j$), and $\beta_{max}$ and $\epsilon_{max}$ to the corresponding and $\epsilon_j$.
 f) The search sector is complementary to the maximum gap, $\delta_{max}$
  i. If $\epsilon_{max}<\beta_{max}$ then the search sector contains North.

EXAMPLES

Example 1

Now referring to the exemplary embodiment illustrated in FIG. 1 with azimuth in degrees, object positions 1, 2 and 3 represent a sequential trajectory of a moving object in which $(b_1,e_1)=(335,10)$, $(b_2,e_2)=(355,15)$, and $(b_3,e_3)=(330,5)$. Condition a) above is not satisfied, i.e. each $e_j-b_j<2\pi$ so the search need not be carried out over all azimuths and the exemplary disclosed method may be carried out to determine the search sector. The calculations according to b) through f), above, are as follows:
1. $(\beta_1, \epsilon_1)=(b_3,e_3)$, $(\beta_2, \epsilon_2)=(b_1,e_1)$, and $(\beta_3, \epsilon_3)=(b_2,e_2)$ (see FIG. 2)
2. for $\beta_1$
    a) The most proximate minimum or maximum in the counter-clockwise direction is $\epsilon_3$.
    b) $\epsilon_1$ does not need to be considered.
    c) $\epsilon_2$ lies clockwise between $\beta_1$ and $\epsilon_3$.
    d) $\delta_1=330-15=315$ since $\beta_1>\epsilon_3$
3. for $\beta_2$
    a) The most proximate minimum or maximum in the counter-clockwise direction is $\beta_1$ so there is no gap
4. For $\beta_3$
    a) The most proximate minimum or maximum in the counter-clockwise direction is $\beta_2$ so there is no gap
5. $\delta_{max}=315$, $(\beta_{max},\epsilon_{max})=(330,15)$
6. The search region is clockwise from $\beta_{max}$ to $\epsilon_{max}$ and contains North.

Figure 3:
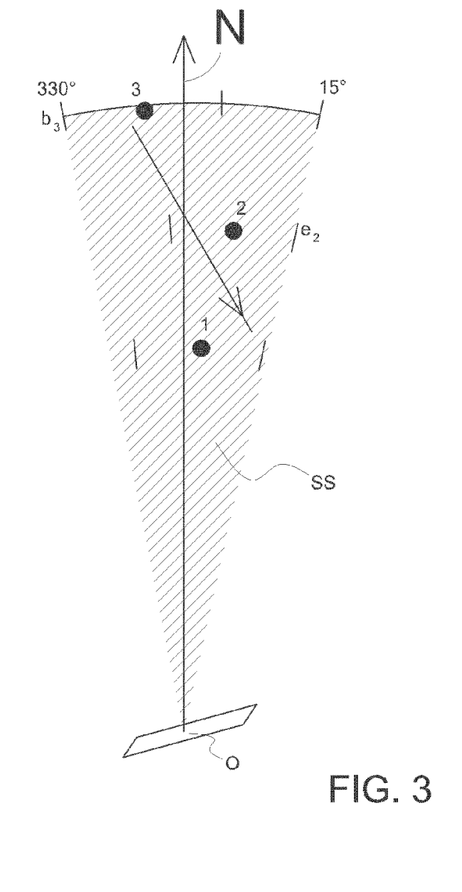

In the preceding example, the maximum gap $\delta_{max}$ is 315 degrees and thus the search sector will be the complementary 45 degree arc. The maximum gap $\delta_{max}$ of 315 is thus between extrema 15 and 330 and the search sector the complementary arc of the circle between extrema 15 and 330. Thus, the search sector SS therefore lies between 330 and 15 degrees and contains North as illustrated in FIG. 3.

Example 2

Now referring to a further exemplary embodiment which object positions 1, 2 and 3 represent a sequential trajectory of a moving object represented by azimuths and associated uncertainties in which $(b_1,e_1)=(5,50)$, $(b_2,e_2)=(80,130)$, and $(b_3,e_3)=(350,55)$. Condition a) above is not satisfied, i.e. each $e_j-b_j<2\pi$ so the search need not be carried out over all azimuths and the exemplary method may be carried out to determine the search sector as follows:

The calculations according to b) through f), above, are as follows:
1. $(\beta_1, \epsilon_1)=(b_1,e_1)$, $(\beta_2, \epsilon_2)=(b_2,e_2)$, and $(\beta_3, \epsilon_3)=(b_3,e_3)$
2. for $\beta_1$,
    a) The most proximate minimum or maximum in the counter-clockwise direction is $\beta_3$ so there is no gap.
3. For $\beta_2$,
    a) The most proximate minimum or maximum in the counter-clockwise direction is $\epsilon_1$
    b) $\epsilon_2$ does not need to be considered
    c) $\epsilon_3$ lies clockwise between $\beta_3$ and $\epsilon_3$
    d) $\delta_1=80-50=30$
4. For $\beta_3$,
    a) The most proximate minimum or maximum in the counter-clockwise direction is $\epsilon_2$.
    b) $\epsilon_3$ does not need to be considered.
    c) $\epsilon_1$ lies clockwise between $\beta_1$ and $\epsilon_2$.
    d) $\delta_3=350-130=220$
5. $\delta_{max}=220$, $(\beta_{max},\epsilon_{max})=(350,130)$
6. The search region is clockwise from $\beta_{max}$ to $\epsilon_{max}$ and contains North.

In this example, the maximum gap $\delta_{max}$ is 220 degrees and thus the search sector will be the complimentary 140 degree arc. The search sector lies between 350 and 130 and thus contains North.

The above calculation approach and algorithm is intended to be exemplary only. The above calculations may be carried out by a conventional processor that may be part of the detector system, the further system capable of engaging the object or yet another system. As such, the identified search sector may be part of the data furnished by the detector system or it may be generated by the receiving system or another system. Various suitable processors are available commercially and may be used. The exemplary algorithm presented supra, may be programmed into the processor using conventional means and may be stored on a suitable executable computer readable medium.

The maximum gap technique identifies a search sector within which the further system, i.e. system with defensive or other engagement capabilities, should search for the object. The further system may then search for the object using radar, other active range determination methods, or other sensing means. According to various exemplary embodiments, the further system then detects the accurate contemporary position of the object and may fire upon the object, take other defensive actions with respect to the object or otherwise engage the object. According to various exemplary embodiments, the further system may use various techniques to observe more closely and identify the nature of the object. Various conventional means may be used to engage the object, for example to fire upon the object.

Figure 4:
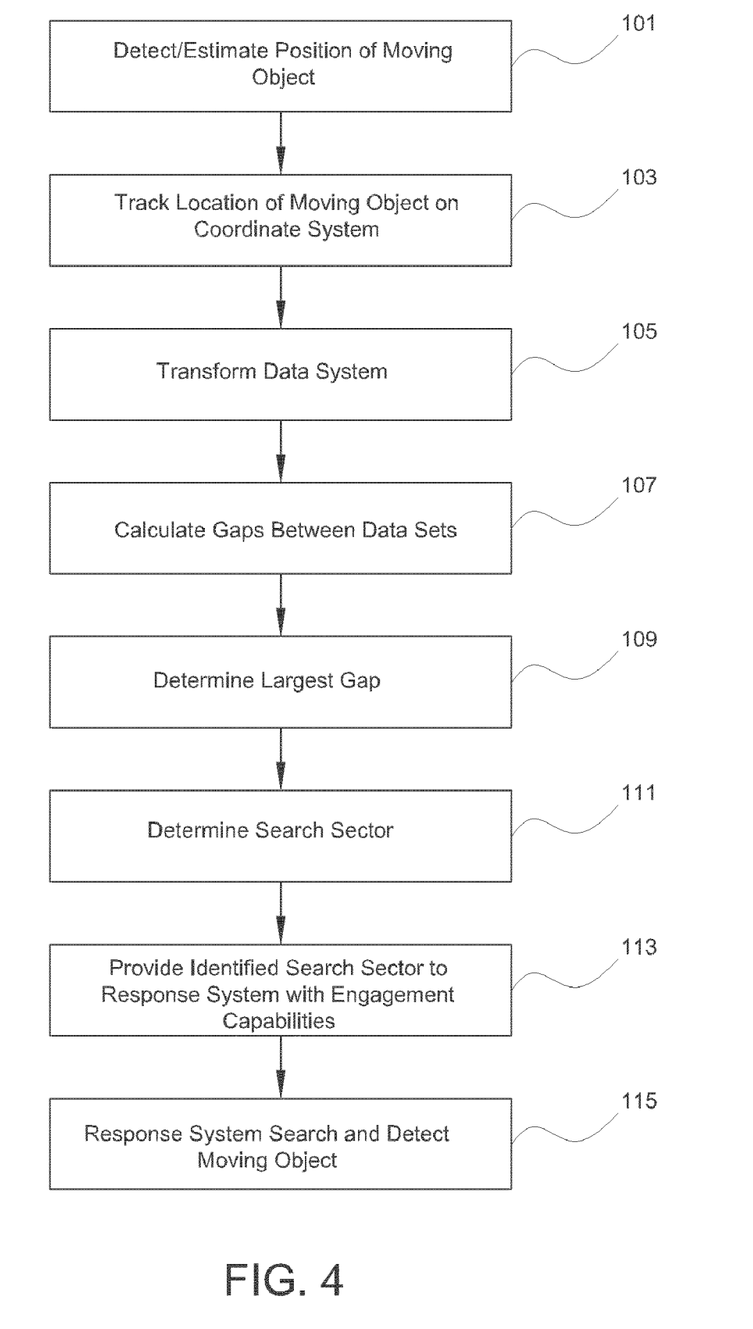
FIG. 4 is a flowchart showing a method according to the invention.

The disclosure thereby provides a method for identifying a space sector within which to search for an object using data transformation such as by a suitable algorithm. Referring to the flow chart of FIG. 4, step 101 provides for detecting or estimating the positions of a moving object. Step 103 provides for tracking the location of the moving object by plotting the position estimates on a coordinate system such as shown in FIG. 1. Step 105 provides for transforming the data system to include data sets such as shown in FIG. 2 and step 107 provides for calculating gaps between the data sets. The maximum gap between the data sets is determined at step 109, the search sector is determined at step 111 based on the maximum gap, and step 113 provides for providing the identified search sector to a response system with engagement capabilities. Step 115 provides for the response system searching for and detecting the present position of the moving object and for engaging the moving object such as by firing upon it.

Also provided is a system for identifying a space sector within which to search for an object. The system includes a central detector for estimating at least three chronologically sequential locations of a moving object and assigning a degree of uncertainty to each of the estimated locations thereby obtaining three estimated sequential locations. Each degree of uncertainty is characterized by a minimum location and a maximum location. The system further includes a processor for calculating gaps between minimum and maximum locations of adjacent ones of the estimated sequential locations and also for selecting a maximum gap of the calculated gaps and also for identifying a space sector within which to search for the moving object, based on the maximum gap. The processor may be part of the central detector system or a discrete processor. The system further includes a further system searching in the space sector for the object, finding its position and engaging the object.

Various suitable processors are commercially available and may be used and the various techniques that are used to utilize the maximum gap method such as the aforementioned calculation, may be programmed into the processor using conventional means.

The preceding merely illustrates the principles of the disclosure. It will thus be appreciated that those skilled in the art will be able to devise various arrangements which, although not explicitly described or shown herein, embody the principles of the disclosure and are included within its spirit and scope. Furthermore, all examples and conditional language recited herein are principally intended expressly to be only for pedagogical purposes and to aid the reader in understanding the principles of the disclosure and the concepts contributed by the inventors to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description.

Although the disclosure has been described in terms of exemplary embodiments, it is not limited thereto. Rather, the appended claims should be construed broadly, to include other variants and embodiments of the disclosure, which may be made by those skilled in the art without departing from the scope and range of equivalents of the disclosure.

What is claimed is:

1. A method for identifying a space sector within which to search for an object, said method comprising:
    estimating three chronologically sequential positions of a moving object by a central detector, thereby obtaining three estimated sequential positions;
    assigning a degree of uncertainty to each said estimated sequential position, each said degree of uncertainty characterized by a minimum position and a maximum position;
    calculating gaps between said minimum and maximum positions of spatially adjacent ones of said estimated sequential positions;
    determining a maximum gap of said calculated gaps;
    identifying a space sector within which to search for said moving object based on said maximum gap; and
    providing said identified space sector to a response system and said response system searching for and detecting said moving object in said identified space sector.

2. The method as in claim 1, wherein said space sector is bounded by extrema data points of said minimum positions and said maximum positions.

3. The method as in claim 2, wherein said identifying a space sector within which to search for said moving object based on said maximum gap comprises identifying which of said minimum and maximum positions is associated with said maximum gap and said search sector comprises a sector being complementary to said maximum gap.

4. The method as in claim 2, wherein said extrema data points comprise two data points on a circle thereby defining an arc and a complementary arc and said identifying a space sector includes determining whether said space sector comprises said arc or said complementary arc.

5. The method as in claim 4, wherein said maximum gap comprises one of said arc and said complementary arc and said search sector comprises the other of said arc and said complementary arc.

6. The method as in claim 1, wherein said identifying a space sector further identifies whether said space sector includes north.

7. The method as in claim 1, wherein each said estimated sequential position represents a primary azimuth on a circle and corresponding said minimum and maximum positions represent start and stop azimuths along a direction on said circle and which bound a corresponding said primary azimuth;
    said identifying a space sector within which to search for said moving object based on said maximum gap comprises performing a mathematical manipulation of said minimum and maximum positions associated with said estimated sequential positions; and
    said mathematical manipulation includes transforming data points of said three estimated sequential positions to produce three corresponding spatial data points arranged spatially according to azimuthal position of associated start azimuths along said circle.

8. The method as in claim 1, wherein said central detector comprises a remote sensor and said estimating and said assigning are performed by said remote sensor.

9. The method as in claim 1, wherein said estimating comprises said central detector transmitting said three estimated sequential positions to a further system and said assigning comprises said central detector transmitting said degrees of uncertainty to said further system.

10. The method as in claim 1, wherein said three estimated sequential positions are propagated from a time of an initial observation to two later times, using a trajectory model.

11. The method as in claim 1, wherein each said degree of uncertainty defines a range of possible locations of each corresponding said estimated sequential position, each said range including a corresponding numerical probability of containing said object and extending from an associated said minimum position to an associated said maximum position.

12. The method as in claim 1, wherein each said estimated sequential position represents a primary azimuth on a circle, corresponding said minimal and maximum positions further represent minimal and maximum azimuths on said circle, and said space sector is represented by an arc on said circle.

13. The method as in claim 1, further comprising said response system firing at said object.

14. The method as in claim 1, wherein said estimating comprises radar detection by a radar system.

15. A system for identifying a space sector within which to search for an object, said system comprising:
    a central detector for estimating at least three chronologically sequential positions of a moving object and assigning a degree of uncertainty to each said estimated position thereby obtaining three estimated sequential positions, each said degree of uncertainty characterized by a minimum position and a maximum position;
    a processor for calculating gaps between minimum and maximum positions of spatially adjacent ones of said estimated sequential positions and determining a maximum gap of said calculated gaps and for identifying a space sector within which to search for said moving object, based on said maximum gap; and means for providing said space sector to an active range determination system capable of engaging said moving object.

16. The system as in claim 15, wherein said central detector and said processor are part of a unitary system.

17. The system as in claim 15, wherein said central detector comprises a radar system.

18. The system as in claim 15, wherein said active range determination system comprises a defense radar system capable of receiving information describing said space sector and firing upon said moving object.

19. The system as in claim 15, wherein said processor executes a program stored on a computer readable medium for calculating said gaps and for identifying said space sector.

20. The system as in claim 15, wherein said central detector presents said three estimated sequential positions as azimuths on a circle, corresponding said minimum and maximum positions as corresponding start and stop azimuths along a direction on said circles and said space sector as an arc of a circle.

21. The system as in claim 20, wherein said processor performs a mathematical transformation of data points of said three estimated sequential positions to produce three corresponding spatial data points used to determine said maximum gap and said space sector.

22. The systems as in claim 15, wherein said space sector is bounded by extreme data points of said minimum positions and maximum positions and comprises an arc of a circle and wherein said processor further identifies whether said arc of said circle includes north.

23. The system as in claim 15, wherein said processor further identifies whether said space sector contains north.

* * * * *